Patented Nov. 28, 1944

2,363,598

UNITED STATES PATENT OFFICE 2,363,598

VULCANIZATION OF RUBBER

Paul C. Jones and Roger A. Mathes, Akron, Ohio, assignors to The B. F. Goodrich Company, New York, N. Y., a corporation of New York No Drawing. Application February 8, 1939, Serial No. 255,359

1 Claim. (Cl. 260—302)

This invention relates to the vulcanization of rubber and has as its object to provide a new and effective class of vulcanization accelerators.

We have observed that polynitroaryl esters of mercaptothiazolines are poor accelerators of vulcanization. We have found, however, that in the presence of a member of the class consisting of monocarboxylic acids and metallic salts thereof, polynitroaryl esters of 2-mercaptothiazolines are excellent accelerators of vulcanization. Any polynitroaryl esters such as the 2,4-dinitrophenyl; 2,6-dinitro-4-chlorophenyl; picryl; 2,6-dinitro-4-methylphenyl; 2,6-dinitro naphthyl; 2,4-dinitro anthryl; and 2,7-dinitro phenanthryl esters of 2-mercaptothiazoline or its substitution products in which one or more of the hydrogens on the carbon atoms are replaced by aliphatic or aromatic groups as disclosed in our copending application Serial No. 255,358, filed February 8, 1939, may be employed in rubber compositions in accordance with the method of this invention. In its broadest scope, accordingly, the invention consists in vulcanizing rubber in the presence of a monocarboxylic acid or metallic salt thereof and a compound containing the structure

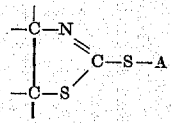

wherein A stands for a polynitro aryl group.

As a specific embodiment of my invention, compositions containing rubber 100 parts by weight, zinc oxide 5 parts, sulfur 3.5 parts, and 1 part of 2,4-dinitrophenyl ester of 2-mercaptothiazoline were vulcanized both in the absence of and in the presence of 3 parts of lauric acid. The vulcanized compositions had the following properties, T signifying tensile strength at break in lbs./in.$^2$ and E signifying the ultimate elongation in per cent:

| Time of cure in minutes at 287° F | Without acid | | With acid | |
|---|---|---|---|---|
| | T | E | T | E |
| 30 | 1,960 | 960 | 2,730 | 890 |
| 60 | 2,370 | 905 | 3,390 | 820 |

It will be observed that the acid produced a marked improvement in the rate of cure and the properties of the vulcanized product.

Any of the saturated or unsaturated monocarboxylic acids such as caprylic, palmitic, oleic, ricinoleic, benzoic, salicylic, toluic, or other like acids or their salts with metals such as lead, tin, sodium, cobalt, nickel, calcium, magnesium, and other alkali, alkaline earth, and heavy metals may be employed in place of the materials used in the specific examples. While the lower fatty acids may be employed if desired, it is preferable to employ their metallic salts, zinc acetate for instance, which are solids. Acids or their metallic salts may be present in any desired proportions, even small amounts usually having a beneficial effect. For the best results however, they should be included in the compositions in amounts varying from 1 to 5% or more.

It is a remarkable and unusual property of the materials of this invention that they are activated by such materials as benzoic acid and salicylic acid which are widely used retarders for other accelerators. This unexpected result indicates that mercaptothiazolines possess properties not shared by other accelerators of vulcanization.

Although the use of the accelerators of this invention has been described in detail in connection with specific rubber compositions, it will be evident that this invention is applicable to rubber compositions of the most varied nature, and that all manner of rubber goods including pneumatic and solid rubber tires, tubes, hose, belting, packing, boots and shoes, surgical rubber goods, seamless dipped rubber articles, etc., may be vulcanized in the presence of the accelerators herein described. The accelerator may be incorporated in the rubber by mastication, milling or any similar process, or in the case of latex, rubber cement, or any other natural or artificial dispersion or solution of rubber by simply dissolving or suspending the accelerator therein.

The vulcanization may be performed in other manners than that particularly set forth in the specific examples; specifically, rubber compositions may be heated in the presence of sulfur or selenium in hot air, steam, hot water, etc.

It is to be understood that the term "rubber" is employed in the appended claim in a generic sense to include caoutchouc, balata, gutta percha, latex, rubber isomers, or synthetic rubber whether or not admixed with pigments, fillers, softeners, antioxidants, other accelerators, etc.

While we have herein disclosed specific embodiments of our invention, we do not intend to limit ourselves solely thereto, for it will be obvious to those skilled in the art that many modifications such as using other materials having equivalent properties and varying the proportions of materials used are within the spirit and scope of the invention as defined in the appended claim.

We claim:

The 2,4-dinitrophenyl ester of 2-mercaptothiazoline.

PAUL C. JONES.
ROGER A. MATHES.